United States Patent
Shimada et al.

(10) Patent No.: US 10,214,324 B2
(45) Date of Patent: Feb. 26, 2019

(54) SYNTHETIC RESIN CONTAINER LID (71) Applicant: NIPPON CLOSURES CO., LTD., Tokyo (JP)

(72) Inventors: Satoru Shimada, Hiratsuka (JP); Masataka Iyadomi, Hiratsuka (JP)

(73) Assignee: NIPPON CLOSURES CO., LTD., Tokyo (JP)

(*) Notice: Subject to any disclaimer, the term of this patent is extended or adjusted under 35 U.S.C. 154(b) by 24 days.

(21) Appl. No.: 15/516,654

(22) PCT Filed: Sep. 4, 2015

(86) PCT No.: PCT/JP2015/075201
§ 371 (c)(1),
(2) Date: Apr. 3, 2017

(87) PCT Pub. No.: WO2016/063641
PCT Pub. Date: Apr. 28, 2016

(65) Prior Publication Data
US 2017/0305612 A1    Oct. 26, 2017

(30) Foreign Application Priority Data
Oct. 21, 2014 (JP) ................. 2014-214695

(51) Int. Cl.
*B65D 41/00* (2006.01)
*B65D 41/34* (2006.01)
(Continued)

(52) U.S. Cl.
CPC ......... *B65D 41/3423* (2013.01); *B32B 27/08* (2013.01); *B65D 41/485* (2013.01);
(Continued)

(58) Field of Classification Search
CPC ............... B65D 41/3423; B65D 55/12; B65D 47/0838; B65D 2255/20; B65D 55/16;
(Continued)

(56) References Cited

U.S. PATENT DOCUMENTS 3,317,070 A * 5/1967 Ignell ............... B65D 1/0246
215/251
3,866,782 A * 2/1975 Westfall ............. B65D 45/30
215/253
(Continued)

FOREIGN PATENT DOCUMENTS

EP 0 729 895  9/1996
FR 2429716  1/1980
(Continued)

OTHER PUBLICATIONS

European Search Report issued in EP 15852951.1.

*Primary Examiner* — Ernesto Grano
(74) *Attorney, Agent, or Firm* — Smith, Gambrell & Russell, LLP.

(57) ABSTRACT

A cap-type synthetic resin container lid is easily removable from a container without separating to form scrap pieces, The container lid includes thin-walled inversion pieces that extend upward beyond a top panel wall from their lower ends which connect to the outer surface of a skirt wall, a restraint wall that is connected to the upper ends of the thin-walled inversion pieces and that has a specific site in the circumferential direction, and an operating section connected to the outer surface of the skirt wall via a connecting piece that extends radially out from the skirt wall at a position in alignment with the specific site. Locked projections and locking projections, on the restraint wall and the connecting piece respectively, restrict expansion of the restraint wall.

6 Claims, 6 Drawing Sheets (51) Int. Cl.
  *B32B 27/08* (2006.01)
  *B65D 47/08* (2006.01)
  *B65D 55/12* (2006.01)
  *B65D 41/48* (2006.01)
  *B65D 45/32* (2006.01)
  *B65D 55/08* (2006.01)
  *B65D 55/16* (2006.01)

(52) U.S. Cl.
  CPC ....... *B65D 45/322* (2013.01); *B65D 47/0838* (2013.01); *B65D 55/0863* (2013.01); *B65D 55/12* (2013.01); *B65D 55/16* (2013.01); *B65D 2255/20* (2013.01)

(58) Field of Classification Search
  CPC ............. B65D 55/0863; B65D 45/322; B65D 41/485; B32B 27/08
  USPC ........................................................ 220/315
  See application file for complete search history.

(56) References Cited

U.S. PATENT DOCUMENTS

| | | | | |
|---|---|---|---|---|
| 3,976,215 A | * | 8/1976 | Smalley | B65D 41/44 215/253 |
| 3,986,627 A | * | 10/1976 | Zapp | B65D 41/185 215/237 |
| 3,990,598 A | | 11/1976 | Zapp et al. | |
| 3,999,678 A | * | 12/1976 | Ignell | B65D 47/141 220/269 |
| 4,192,428 A | * | 3/1980 | Segmuller | B65D 51/18 215/256 |
| 4,220,249 A | * | 9/1980 | Nilsson | B65D 39/04 215/237 |
| 4,279,353 A | | 7/1981 | Honma | |
| 4,328,906 A | * | 5/1982 | Walter | B65D 47/141 220/260 |
| D268,484 S | * | 4/1983 | Morris | D9/443 |
| 4,420,089 A | * | 12/1983 | Walker | B65D 50/066 215/216 |
| 4,516,684 A | | 5/1985 | Walter | |
| 4,534,481 A | * | 8/1985 | Summers | B65D 41/48 215/253 |
| 6,116,441 A | * | 9/2000 | Decelles | B65D 47/0838 215/237 |
| D632,962 S | * | 2/2011 | Traldi | D9/416 |
| 8,047,387 B2 | * | 11/2011 | Chalekian | B65D 51/242 215/200 |
| 8,561,834 B2 | * | 10/2013 | Ziegler | A47G 23/0233 220/212.5 |
| 8,646,633 B2 | * | 2/2014 | Huntington | B65D 47/08 215/235 |
| 8,695,842 B2 | * | 4/2014 | Gonzalez Sanchez | B65D 51/007 215/232 |
| 2011/0064537 A1 | * | 3/2011 | Wrigley | A62B 9/00 411/315 |
| 2012/0103993 A1 | | 5/2012 | Chae | |
| 2018/0155094 A1 | * | 6/2018 | Loukov | B65D 50/062 |

FOREIGN PATENT DOCUMENTS

| | | |
|---|---|---|
| JP | 2012-201399 | 10/2012 |
| JP | 2012-530654 | 12/2012 |
| JP | 2015-168435 | 9/2015 |

* cited by examiner

SYNTHETIC RESIN CONTAINER LID

TECHNICAL FIELD

This invention relates to a synthetic resin container lid of a type, generally called cap type, which is fitted onto a mouth-neck section of a container, and urged downward to be mounted on the mouth-neck section.

BACKGROUND ART

Patent Document 1 to be indicated below discloses a synthetic resin container lid as a cap type synthetic resin container lid which can seal the mouth-neck section of a container sufficiently reliably, but can be removed from the mouth-neck section of the container without the use of an unsealing instrument. The synthetic resin container lid includes a circular top panel wall, a cylindrical skirt wall extending downward from the peripheral edge of the top panel wall and, in addition, a cylindrical restraint wall connected to the outer peripheral surface of the skirt wall via a breakable connecting section, and an operating section extending out downwardly beyond the skirt wall from the upper end of the operating section connected to the skirt wall. To mount the container lid on the mouth-neck section of the container, the skirt wall is fitted onto the mouth-neck section, and urged downward to bring an engagement ridge formed on the inner peripheral surface of the skirt wall into engagement with an engagement ridge formed on the outer peripheral surface of the mouth-neck section. Moreover, the restraint wall is urged downward with respect to the skirt wall, whereby the connecting section is broken to lower the restraint wall to such a state as to surround the skirt wall. To remove the container lid from the mouth-neck section of the container, thereby unsealing the mouth-neck section, the fingers are hooked over the operating section, and the operating section is urged radially outwardly and upwardly. By so doing, the restraint wall is partially displaced upward, and the skirt wall is partly displaced upward to remove the whole of the container lid from the mouth-neck section.

PRIOR ART DOCUMENTS

Patent Documents

Patent Document 1: JP-A-2012-201399

SUMMARY OF THE INVENTION

Problems to be Solved by the Invention

The conventional container lid mentioned above, however, has still not been sufficiently satisfactory, and has posed the following problems to be solved: (1) In removing the container lid from the mouth-neck section of the container, considerably great force is required for displacing the restraint wall radially outwardly and upwardly. (2) When the container lid is removed from the mouth-neck section of the container, the restraint wall cut off from the skirt wall upon breakage of the connecting section may be separated from the top panel wall and the skirt wall to become a scrap piece.

The present invention has been accomplished in the light of the above facts. Its main technical challenge is to provide a novel and improved cap-type synthetic resin container lid which can be removed sufficiently easily from a mouth-neck section of a container without requiring great force and, even after removal from the mouth-neck section of the container, continues to be maintained integral without being partly separated to form a scrap piece.

Means for Solving the Problems

Upon in-depth studies, the present inventors have found that the above main technical challenge can be solved by configuring a synthetic resin container lid to include thin-walled inversion pieces arranged at intervals in a circumferential direction and extending upward beyond a top panel wall from the lower ends of the thin-walled inversion pieces, the lower ends being connected to the outer peripheral surface of a skirt wall or to the boundary part between the outer peripheral surface of the skirt wall and the upper surface of the top panel wall; a restraint wall connected to the upper ends of the thin-walled inversion pieces and having a specific site in the circumferential direction, the specific site being split or being defined by a breakable weakened section; and an operating section connected at a position aligned with the specific site to the outer peripheral surface of the skirt wall by a connecting piece extending out radially from the outer peripheral surface of the skirt wall, wherein the restraint wall and the connecting piece are provided with locked projections and locking projections which collaborate to restrict the expansion of the restraint wall.

That is, according to the present invention, there is provided, as a synthetic resin container lid for solving the above main technical challenge, a synthetic resin container lid including a circular top panel wall, and a skirt wall extending downwardly from the peripheral edge of the top panel wall, a locking ridge being formed on the inner peripheral surface of the skirt wall, wherein a plurality of thin-walled inversion pieces extending upward beyond the top panel wall from lower ends of the thin-walled inversion pieces are arranged at intervals in a circumferential direction, the lower ends being connected to an outer peripheral surface of the skirt wall or to a boundary part between the outer peripheral surface of the skirt wall and an upper surface of the top panel wall;

a restraint wall is connected to upper ends of the thin-walled inversion pieces, a specific site in the circumferential direction of the restraint wall is either split, or is defined by a breakable weakened section, and locked projections protruding radially outwardly from an outer peripheral surface of the restraint wall are formed on both sides in the circumferential direction of the specific site;

an operating section is connected to the outer peripheral surface of the skirt wall via a connecting piece extending out radially from the outer peripheral surface of the skirt wall, the connecting piece is located in alignment with the specific site in the circumferential direction, and locking projections protruding radially inwardly are formed in the operating section on both sides in the circumferential direction of the connecting piece; and when the thin-walled inversion pieces are inverted to extend downward from the lower ends, the restraint wall surrounds the skirt wall, and the locked projections and the locking projections collaborate to restrict expansion of the restraint wall.

In a preferred embodiment, when the thin-walled inversion pieces are inverted to extend downward from the lower ends, the connecting piece acts on the weakened section to break the weakened section. Advantageously, the operating section includes a ring over which fingers can be hooked. It is preferred that a plurality of slits extending upward from a lower end of the skirt wall are formed at intervals in the circumferential direction in the skirt wall. Preferably, the inner diameter of parts in the restraint wall aligning with the thin-walled inversion pieces in the circumferential direction is set to be larger than the inner diameter of other parts except the specific site, and the inner diameter of the other parts is brought into correspondence with the outer diameter of the skirt wall. It is preferred that a plurality of concavities extending from the lower end to the upper end of the skirt wall are arranged at intervals in the circumferential direction in the outer peripheral surface of the skirt wall, and that the lower ends of the thin-wailed inversion pieces are connected to the concavities.

Effects of the Invention

In the synthetic resin container lid of the present invention, when the container lid is to be removed from the mouth-neck section of the container, the operating section is displaced upward, whereby the collaboration between the locked projections and the locking projections is released to permit the expansion of the restraint wall. Therefore, the container lid can be removed sufficiently easily from the mouth-neck section of the container without requiring great force. Even after removal of the container lid from the mouth-neck section of the container, the restraint wall continues to be connected to the skirt wall or the top panel wall by the thin-walled inversion pieces, without formation of any scrap piece.

MODE FOR CARRYING OUT THE INVENTION

The present invention will now be described in further detail by reference to the accompanying drawings showing a synthetic resin container lid configured in accordance with the present invention.

Figure 1:
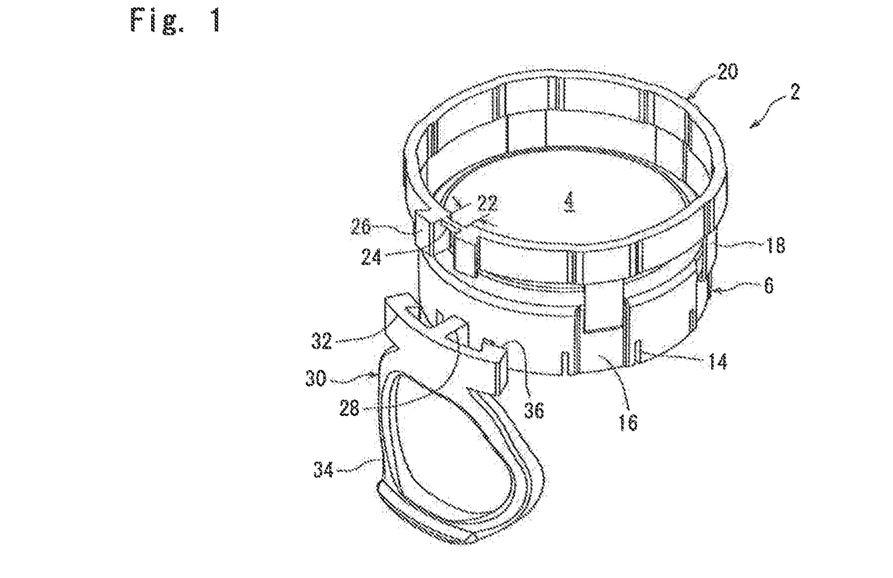
FIG. 1 is a perspective view showing a preferred embodiment of a synthetic resin container lid configured in accordance with the present invention.
Figure 2:
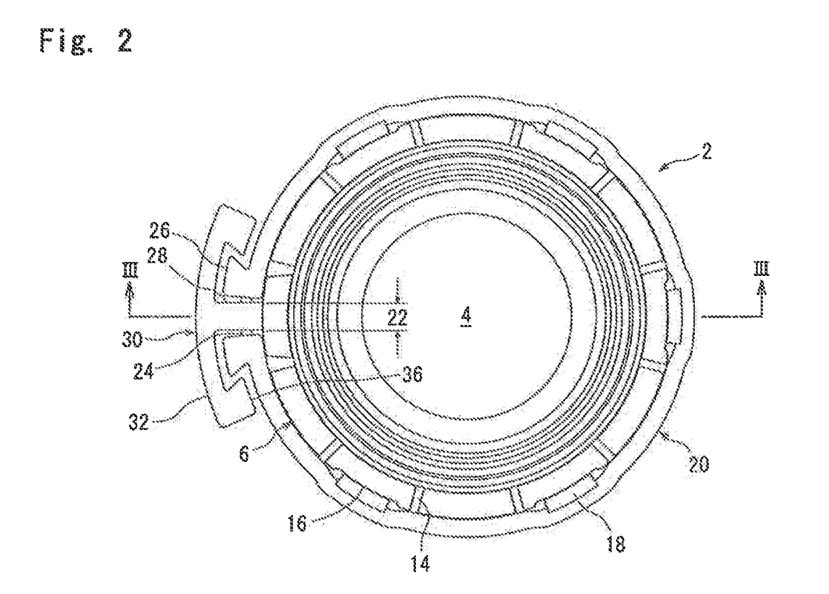
FIG. 2 is a bottom view of the container lid shown in FIG. 1.
Figure 3:
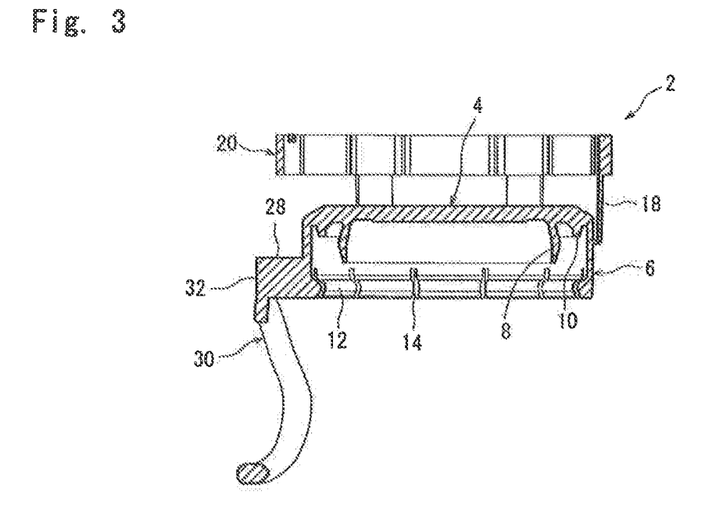
FIG. 3 is a sectional view on line in FIG. 2.

With reference to FIGS. 1 to 3, a container lid illustrated there and entirely indicated at 2, which can be integrally injection or compression molded from a suitable synthetic resin such as polyethylene or polypropylene, comprises a top panel wall 4, and a skirt wall 6 extending downwardly from the peripheral edge of the top panel wall 4. The top panel wall 4 is circular in a plan view, and has a flat middle part, and a peripheral edge part inclined downwardly in a radially outward direction. As clearly shown in FIG. 3, two annular sealing pieces extending out downwardly, namely, an inner sealing piece 8 and an outer sealing piece 10, are disposed in a peripheral edge part of the inner surface of the top panel wall 4.

The skirt wall 6 is nearly cylindrical as a whole. An annular locking ridge 12 is formed in a lower end part of the inner peripheral surface of the skirt wall 6. As will be clearly understood by reference to FIGS. 1 and 3, a plurality of, twelve in the drawings, slits 14 extending upward from the lower end of the skirt wall 6 are formed in a lower end part of the skirt wall 6. A plurality of, five in the drawings, concavities 16 extending from the lower end to the upper end of the skirt wall 6 are arranged at intervals in the circumferential direction in the outer peripheral surface of the skirt wall 6. The lower ends of thin-walled inversion pieces 18 are connected to upper parts of the concavities 16. The thin-walled inversion pieces 18 are extended out upwardly beyond the top panel wall 4. If desired, the lower ends of the thin-walled inversion pieces 18 can be connected to a boundary region between the skirt wall 6 and the top panel wall 4, instead of to the outer peripheral surface of the skirt wall 6.

A restraint wall 20 is connected to the upper ends of the thin-walled inversion pieces 18. The restraint wall 20 is of a nearly toroidal shape, and a specific site 22 thereof in its circumferential direction is defined by a breakable weakened section 24 composed of a bridging piece having a small cross-sectional area. If desired, an extremely weak site having a decreased cross-sectional area can be formed, for example, in a circumferentially middle part of the bridging piece constituting the weakened section 24. Furthermore, the restraint wall 20 can be split at the specific site 22 without disposing the weakened section 24. If the weakened section 24 is disposed without splitting of the specific site 22, however, the torsion or excessive expansion of the restraint wall 20 can be avoided sufficiently reliably, when the container lid 2 is mounted on the mouth-neck section 38 of the container, as will be mentioned later. It is preferred, therefore, to dispose the weakened site 24 without splitting the specific site 22. In the illustrated embodiment, moreover, the weakened section 24 is disposed at the upper end part of the restraint wall. 20 in the axial direction, but can be disposed in the middle of the restraint wall 20 in the axial direction. On both sides of the specific site 22 in the circumferential direction, locked projections 26 protruding radially outwardly are formed. The circumferentially inside surfaces of the locked projections 26 (namely, the side surfaces adjacent to the specific site 22) extend in the radial direction, while the circumferentially outside surfaces of the locked projections 26 (namely, the side surfaces spaced from the specific site 22) are inclined surfaces extending circumferentially outwardly in a radially outward direction. As will be clearly understood by reference to FIG. 2 along with FIG. 1, at the plurality of sites where the thin walled inversion pieces 18 are present, the restraint wall 20 is locally somewhat displaced radially outwardly. At such sites, therefore, the inner diameter of the restraint wall 20 is locally somewhat increased as compared with the inner diameter of other parts except the specific site 22 (the inner diameter of such other parts corresponds to the outer diameter of parts of the skirt wall 6 where the concavities 16 have not been formed and, in other words, is nearly the same as the above outer diameter).

An operating section 30 is connected to the outer peripheral surface of the skirt wall 6 via a connecting piece 28 protruding radially outwardly. The circumferential position of the operating section 30 is in alignment with the circumferential position of the specific site 22 of the restraint wall 20. The operating section 30 is composed of a base 32 and a ring 34, and the inner surface of the base 32 is connected to the protruding end of the connecting piece 28. The base 32 extends out circumferentially bilaterally, and locking projections 36 protruding radially inwardly are formed on the inner surfaces of the opposite side ends located on both sides of the connecting piece 28. The circumferentially outside surfaces of the locking projections 36 (namely, the side surfaces spaced from the connecting piece 28) extend radially, while the circumferentially inside surfaces of the locking projections 36 (namely, the side surfaces adjacent to the connecting piece 28) are inclined surfaces inclined circumferentially inwardly in a radially inward direction. The ring 34 suspending from the base 32 is of a nearly toroidal shape.

Figure 5:
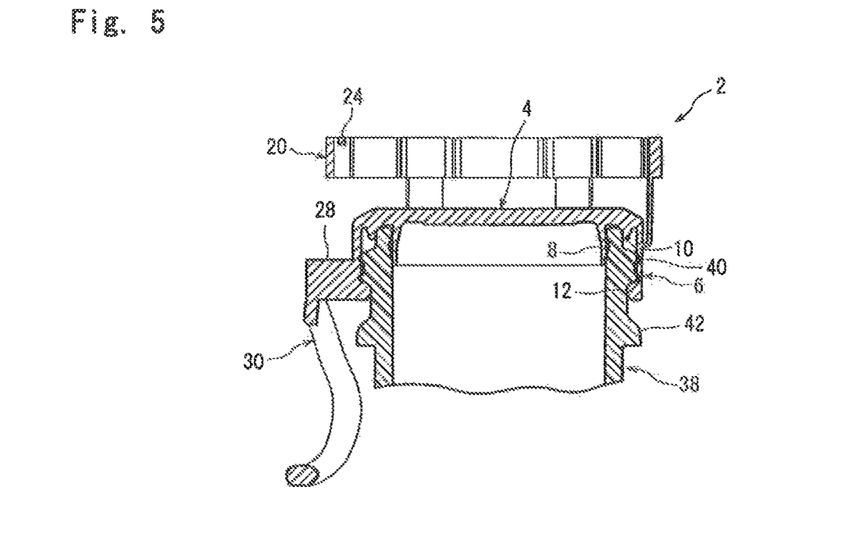
FIG. 5 is a sectional view showing the intermediate stage of the mounting operation for mounting the container lid shown in FIG. 1 on the mouth-neck section of the container.

A typical example of a mouth-neck section of a container to which the above container lid 2 is applied will be described by reference to FIG. 5. A mouth-neck section 38 of a container which can be molded from a suitable synthetic resin, such as polyethylene terephthalate, or glass is cylindrical as a whole, and an annular locking ridge 40 is formed in an upper end part of the outer peripheral surface of the mouth-neck section. In the illustrated embodiment, an annular groove is disposed in an axially middle part of the locking ridge 40. Below the locking ridge 40, a support ring 42 to be utilized during transport of the container is formed.

Figure 4:
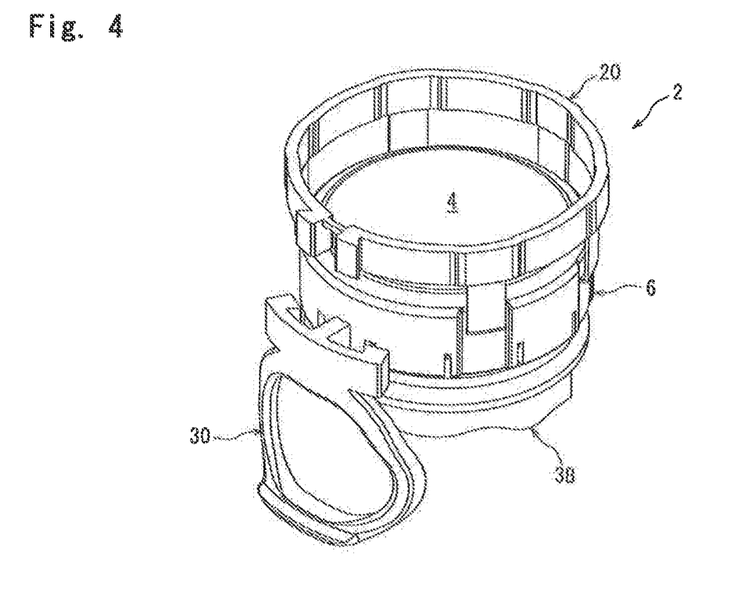
FIG. 4 is a perspective view showing the intermediate stage of a mounting operation for mounting the container lid shown in FIG. 1 on a mouth-neck section of a container.
Figure 6:
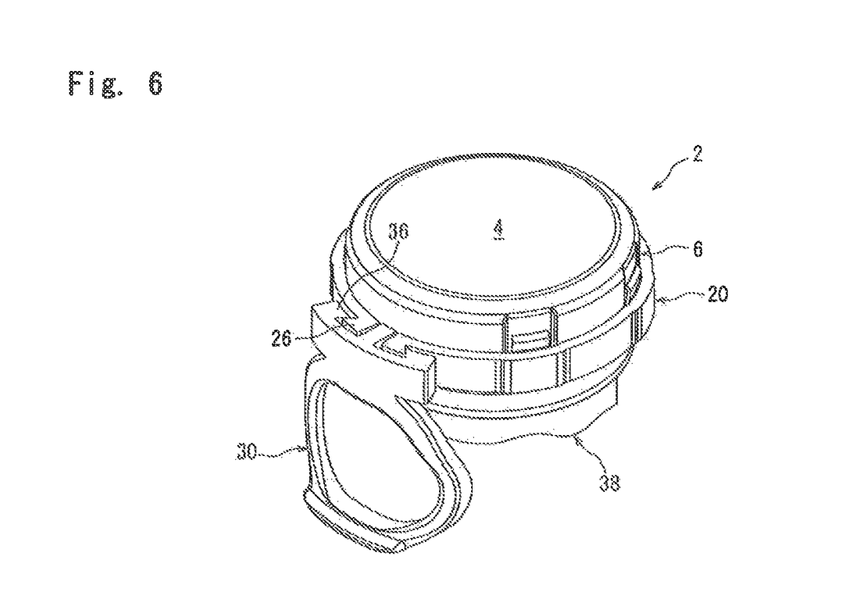
FIG. 6 is a perspective view showing a state in which the container lid shown in FIG. 1 has been mounted on the mouth-neck section of the container.
Figure 7:
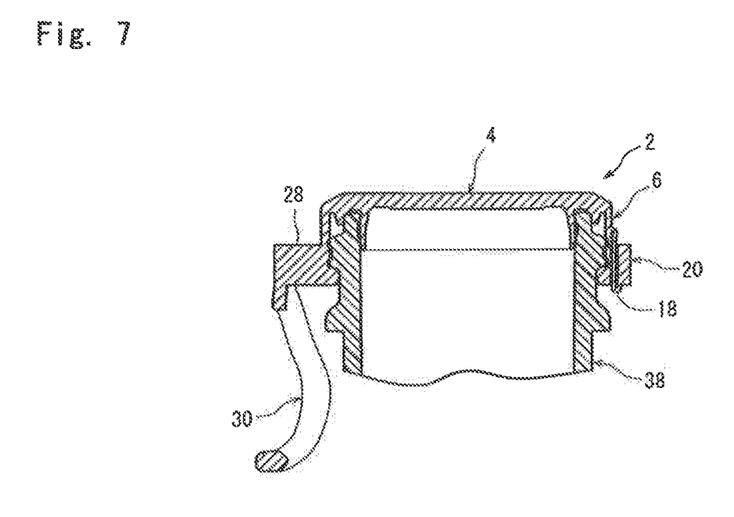
FIG. 7 is a sectional view showing a state in which the container lid shown in FIG. 1 has been mounted on the mouth-neck section of the container.

In mounting the container lid 2 on the mouth-neck section 38 of the container to seal the mouth-neck section 38, the container lid 2 is fitted onto the mouth-neck section 38 and urged downward. As a result, as shown in FIGS. 4 and 5, the locking ridge 12 formed in the lower end part of the inner peripheral surface of the skirt wall 6 elastically rides over the locking ridge 40 of the mouth-neck section 38, and becomes locked below it. The inner sealing piece 8 disposed in the peripheral edge part of the inner surface of the top panel wall 4 advances into the mouth-neck section 38, and intimately contacts the inner peripheral surface of the mouth-neck section 38, whereas the outer sealing piece 10 intimately contacts the outer peripheral surface of the mouth-neck section 36. Then, the restraint wall 20 is urged downward to invert the thin-walled inversion pieces 18, that is, to bring the thin-walled inversion pieces 18 into a state in which they extend downward from their lower ends connected to the outer peripheral surface of the skirt wall 6, as shown in FIGS. 6 and 7. At the sites of arrangement of the thin-walled inversion pieces 18, the concavities 16 are formed in the outer peripheral surface of the skirt wall 6, and the restraint wall 20 is locally somewhat displaced radially outwardly. Thus, the thin-walled inversion pieces 18 can be inverted sufficiently easily. When the thin-walled inversion pieces 18 are inverted, the restraint wall 20 surrounds the skirt wall 6 to inhibit the skirt wall 6 from being elastically deformed or displaced in the radially outward direction, so that the container lid 2 is firmly mounted on the mouth-neck section 38. When the restraint wall 20 is lowered to the position shown, in FIGS. 6 and 7, the connecting piece 28 disposed on the outer peripheral surface of the skirt wall 6 acts on the weakened section 24 of the restraint wall 20 to break the weakened section 24, as will be clearly understood by comparison between FIGS. 4, 5 and FIGS. 6, 7. If the extremely weak site is present circumferentially intermediately of the bridging piece constituting the weakened section 24, the breakage occurs at the extremely weak site. As clearly shown in FIG. 6, moreover, the locked projections 26 disposed in the restraint wall 20 and the locking projections 36 disposed in the operating section 30 are locked to each other, whereby the expansion of the restraint wall 20 is restricted and, more detailedly, the displacement of both sides of the specific site 22 in the direction of mutual separation is restricted. As will be understood by reference to FIG. 2, in the state prior to the mounting of the container lid 2 on the mouth-neck section 38 of the container, the circumferentially outside surfaces of the locked projections 26 are positioned circumferentially somewhat apart from the circumferentially inside surfaces of the locking projections 36. When the container lid 2 is mounted on the mouth-neck section 38 of the container in the above-mentioned manner, however, the restraint wall 20 is somewhat expanded. As a result, the circumferentially outside surfaces of the locked projections 26 contact or approach the circumferentially inside surfaces of the locking projections 36, as shown in FIG. 6.

Figure 8:
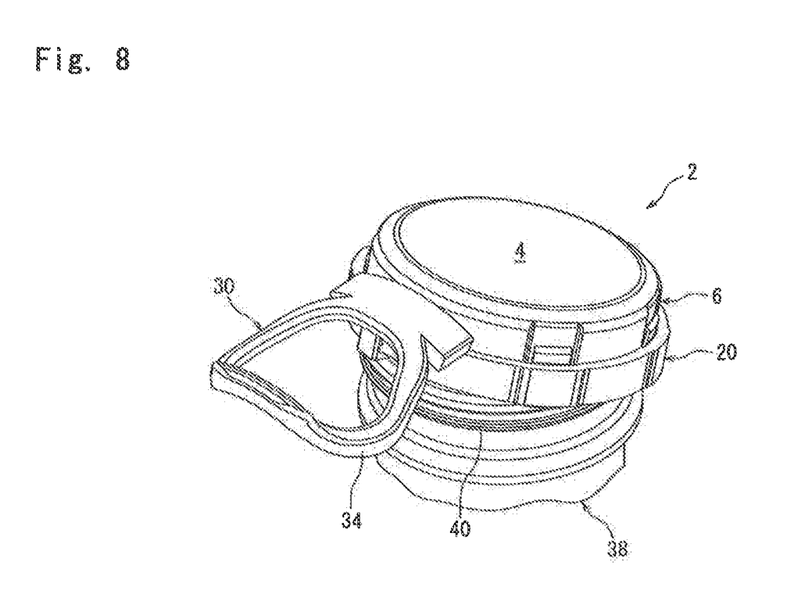
FIG. 8 is a perspective view showing the intermediate stage of a removal operation for removing the container lid shown in FIG. 1, which has been mounted on the mouth-neck section of the container, from the mouth-neck section.
Figure 9:
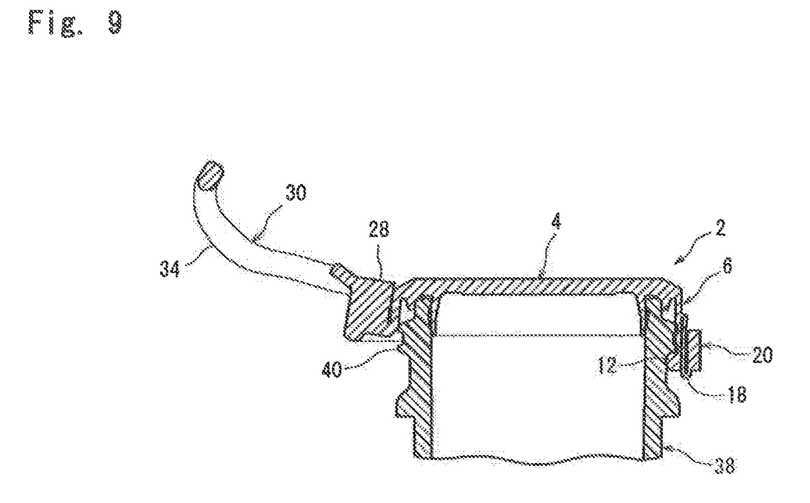
FIG. 9 is a sectional view showing the intermediate stage of the removal operation for removing the container lid shown in FIG. 1, which has been mounted on the mouth-neck section of the container, from the mouth-neck section.
Figure 10:
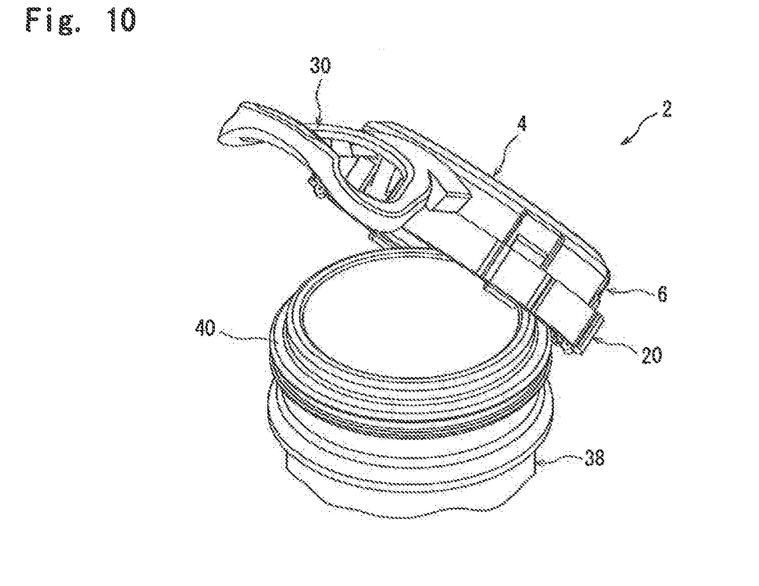
FIG. 10 is a perspective view showing the final stage of the removal operation for removing the container lid shown in FIG. 1, which has been mounted on the mouth-neck section of the container, from the mouth-neck section.
Figure 11:
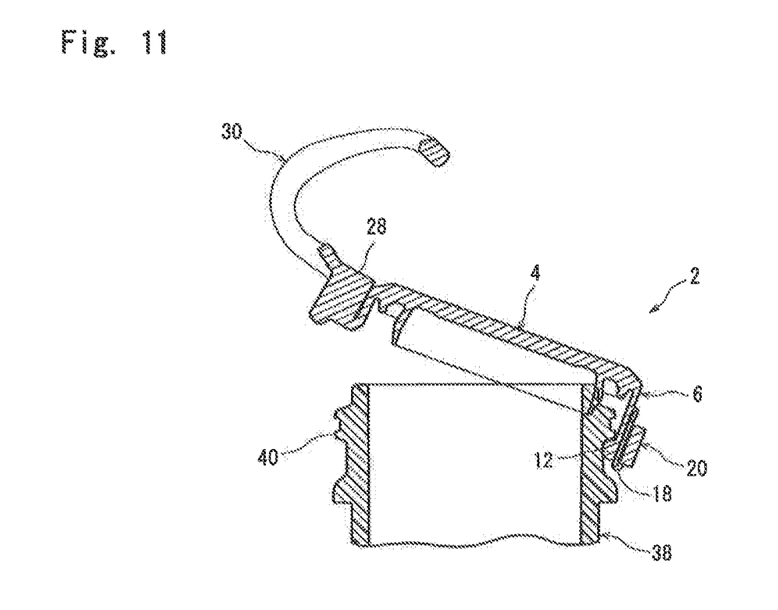
FIG. 11 is a sectional view showing the final stage of the removal operation for removing the container lid shown in FIG. 1, which has been mounted on the mouth-neck section of the container, from the mouth-neck section.

In removing the container lid 2 from the mouth-neck section 38 of the container to unseal the mouth-neck section 38, the fingers are hooked over the ring 34 of the operating section 30 to displace the operating section 30 radially outwardly and upwardly. When the operating section 30 is displaced to the position shown in FIGS. 8 and 9, the mutual locking of the locking projections 36 disposed in the operating section 30 and the looked projections 26 disposed in the restraint wall 20 is released to permit the expansion of the restraint wall 20. Thus, the radially outward displacement of the skirt wail 6, in particular, its lower end part, is permitted. Consequently, the mutual locking between the locking ridge 12 formed at the lower end part of the inner peripheral surface of the skirt wall 6 and the locking ridge 40 of the Mouth-neck section 38 is partially released, whereby the skirt wall 6 is partly displaced upward. If the pressure inside the container is higher than the atmospheric pressure, the sealing of the mouth-neck section 38 is locally released at a time when the partial ascent of the skirt wall 6 begins. As a result, the pressure inside the container is released, thus preventing the container lid 2 from flying from the mouth-neck section 38 accidentally. When the ring 34 is then displaced upward toward a radially opposite side, the whole of the container lid 2 is removed from the mouth-neck section 38 to unseal the mouth-neck section 38, as will be clearly understood by reference to FIGS. 10 and 11.

The preferred embodiment of the container lid configured in accordance with the present invention has been described in detail by reference to the accompanying drawings. However, the present invention is not limited to such an embodiment, and various changes and modifications can be made without departing from the scope of the present invention. In the illustrated embodiment, for example, when the restraint wall 20 is lowered with respect to the skirt wall 6 in mounting the container lid 2 on the mouth-neck section 38 of the container, the weakened section 24 of the restraint wail 20 is broken. If desired, however, the present invention can be configured such that when the container lid 2 is mounted on the mouth-neck section 38, the connecting piece 28 or the operating section 30 does not act on the weakened section 24, but instead, when the operating section 30 is displaced in removing the container lid 2 from the mouth-neck section 38, the connecting piece 28 or the operating section 30 acts on the weakened section 24 to break it.

EXPLANATIONS OF LETTERS OR NUMERALS

2: Container lid
4: Top panel wail
6: Skirt wall
12: Locking ridge
14: Slit
16: Concavity
18: Thin-walled inversion piece
20: Restraint wall
22: Specific site
24: Weakened section
26: Locked projection
28: Connecting piece
30: Operating section
34: Ring
36: Locking projection
38: Mouth-neck section
40: Locking ridge

The invention claimed is:

1. A synthetic resin container lid including a circular top panel wall, a skirt wall extending downwardly from a peripheral edge of the circular top panel wall, and a locking ridge formed on an inner peripheral surface of the skirt wall, wherein
  thin-walled inversion pieces extend upward beyond the circular top panel wall from lower ends thereof, the thin-walled inversion pieces being arranged at intervals in a circumferential direction, and the lower ends being connected to an outer peripheral surface of the skirt wall or to a boundary part between the outer peripheral surface of the skirt wall and an upper surface of the circular top panel wall;
  a restraint wall is connected to upper ends of the thin-wailed inversion pieces;
  a specific site in the circumferential direction of the restraint wail is either split, or is defined by a breakable weakened section;
  locked projections protruding radially outwardly from an outer peripheral surface of the restraint wall are formed on both sides in the circumferential direction of the specific site;
  an operating section having locking projections is connected to the outer peripheral surface of the skirt wall via a connecting piece extending out radially from the outer peripheral surface of the skirt wall, the connecting piece being located in alignment with the specific site in the circumferential direction, and the locking projections protruding radially inwardly on both sides in the circumferential direction of the connecting piece; and
  when the thin-walled inversion pieces are inverted to extend downward from the lower ends, the restraint wall surrounds the skirt wall, and the locked projections and the locking projections collaborate to restrict expansion of the restraint wall.

2. The synthetic resin container lid according to claim 1, wherein when the thin-walled inversion pieces are inverted to extend downward from their lower ends, the connecting piece acts on the weakened section to break the weakened section.

3. The synthetic resin container lid according to claim 1, wherein the operating section includes a ring over which fingers can be hooked.

4. The synthetic resin container lid according to claim 1, wherein a plurality of slits extending upward from a lower end of the skirt wall are formed at intervals in the circumferential direction in the skirt wall.

5. The synthetic resin container lid according to claim 1, wherein
  in addition to the specific site, the restraint wall has portions aligning with the thin-walled inversion pieces and portions not aligning with the thin-walled inversion pieces in the circumferential direction,
  an inner diameter of the restraint wall corresponding to the portions thereof aligning with the thin-walled inversion pieces is larger than an inner diameter of the restraint wall corresponding to the portions thereof not aligning with the thin-walled inversion pieces, and
  the inner diameter of the restraint wall corresponding to the portions thereof not aligning with the thin-walled inversion pieces is brought into correspondence with an outer diameter of the skirt wall.

6. The synthetic resin container lid according to claim 1, wherein concavities that extend from a lower end to an upper end of the skirt wall are arranged at intervals in the circumferential direction in the outer peripheral surface of the skirt wall, and the lower ends of the thin-walled inversion pieces are connected to the concavities.

* * * * *